May 11, 1965  C. B. ASKE, JR  3,183,038
WHEEL AND TIRE TRIM CONSTRUCTION
Filed Nov. 14, 1963  3 Sheets-Sheet 1
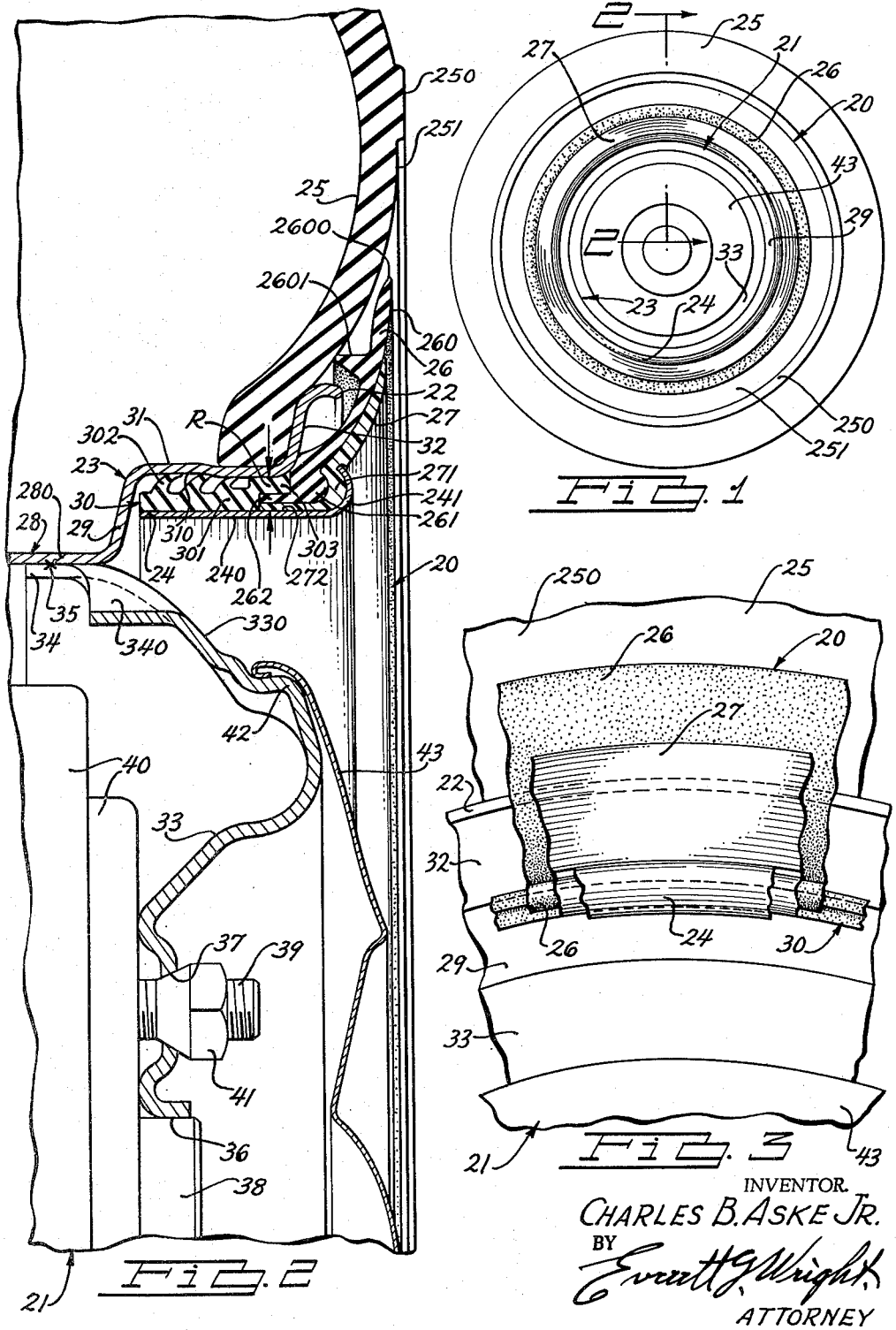
INVENTOR.
CHARLES B. ASKE JR.
BY
Everett G. Wright
ATTORNEY May 11, 1965 C. B. ASKE, JR 3,183,038
WHEEL AND TIRE TRIM CONSTRUCTION
Filed Nov. 14, 1963 3 Sheets-Sheet 2
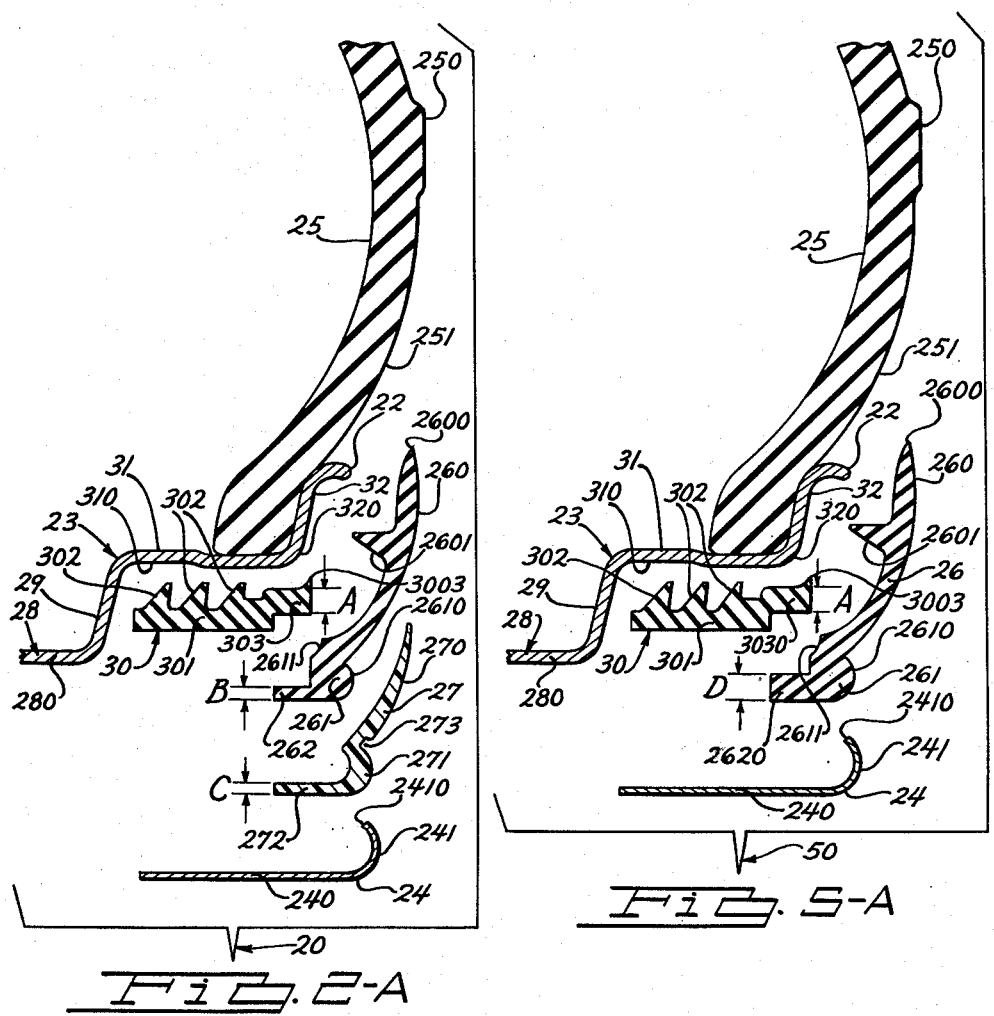
INVENTOR.
CHARLES B. ASKE JR.
BY
ATTORNEY

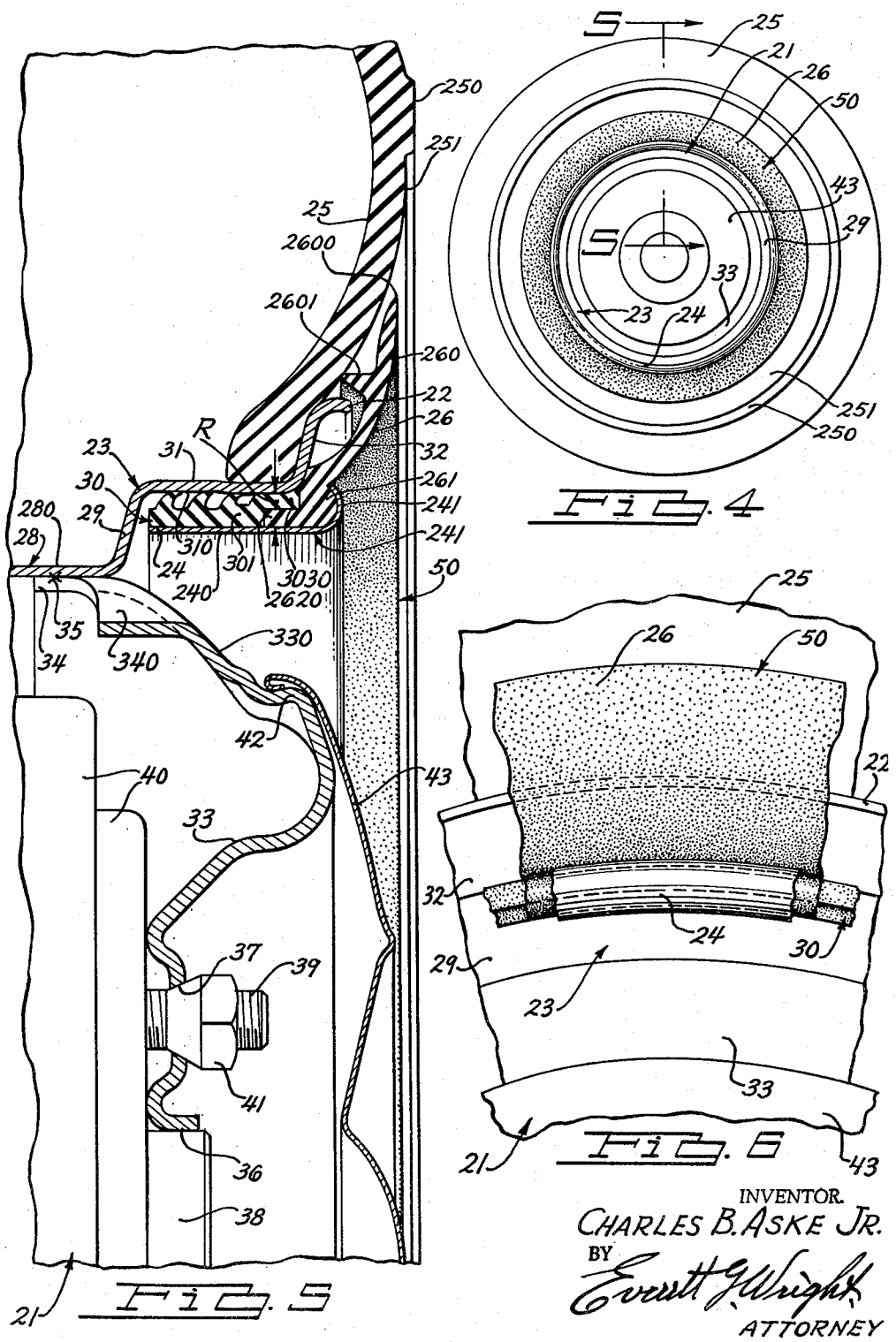

United States Patent Office 3,183,038
Patented May 11, 1965

3,183,038
WHEEL AND TIRE TRIM CONSTRUCTION
Charles B. Aske, Jr., Birmingham, Mich., assignor, by direct and mesne assignments, to Gar Wood Industries, Inc., a corporation of Michigan
Filed Nov. 14, 1963, Ser. No. 323,761
6 Claims. (Cl. 301—37)

The invention relates to improved wheel and tire trim construction consisting of an assembly of a rim trim, either a one piece tire trim for a single color tire trim or a two piece tire trim for a striped tire trim, and a separate annularly toothed resilient anchorage means for securing the wheel and tire trim assembly onto the vehicle wheel, the said resilient anchorage means including an integral compressible pressure pad for securing the several elements of the tire trim in assembled relationship within the rim trim when the wheel and tire trim assembly is mounted on the vehicle wheel.

The primary object of the invention is to provide an improved wheel and tire trim as aforesaid which is economical to manufacture, which permits the use of either rubber or combined rubber and butyl or other artificial rubber elements, which may employ either single color or multi-color tire trim, and which provides simple and positive securement of the several elements of the tire trim within the wheel trim coupled with the positive anchorage of the entire wheel trim-tire trim assembly to the vehicle wheel.

A further object of the invention is to provide an improved wheel and tire trim construction for automotive vehicles consisting of an annular wheel trim element onto which is assembled a tire trim element, optionally with a color stripe element, and an anchorage element, the said wheel trim-tire trim assembly being telescopingly mounted on the vehicle wheel rim in the tire bead seat annulus thereof employing both resilient toothed means and compressive means for removably anchoring the said assembly in unitary relationship on said vehicle wheel.

Other objects of the invention will become apparent by reference to the following detailed description taken in connection with the accompanying drawings, in which:

FIG. 1 is an axial elevational view of a vehicle wheel and tire having mounted thereon vehicle wheel and multi-color or striped tire trim of the invention.

FIG. 2 is an enlarged fragmentary sectional view taken on the line 2—2 of FIG. 1.

FIG. 2-A is an exploded sectional view showing the elements of multi-color or striped tire trim and wheel trim of the invention before assembly and mounting on the vehicle wheel.

FIG. 3 is an enlarged fragmentary elevational view of the wheel and multi-color or striped tire trim of FIGS. 1, 2 and 2-A.

FIG. 4 is an axial elevational view of a vehicle wheel and tire having mounted thereon vehicle wheel and single color tire trim of the invention.

FIG. 5 is an enlarged fragmentary sectional view taken on the line 5—5 of FIG. 4.

FIG. 5-A is an enlarged exploded sectional view showing the elements of single color tire trim and wheel trim of the invention before assembly and mounting on the vehicle wheel.

FIG. 6 is an enlarged fragmentary elevational view of the wheel and single color tire trim of FIGS. 4, 5 and 5-A.

Referring now to the drawings wherein like reference characters refer to like and corresponding parts throughout the several views, the particular embodiment of the invention disclosed in FIGS. 1, 2, 2-A and 3 consists of a vehicle wheel trim and striped tire trim assembly generally designated by the numeral 20 and which is readily sub-assembled and mounted on a vehicle wheel 21 having a tubeless tire 25 thereon.

The said vehicle wheel 21 has a drop center rim 23 composed of a central channel or drop center 28 having side walls 29 and a base 280. An annular tire bead seat 31 extends laterally outwardly from each side of the side walls 29 of the drop center 28, each said tire bead seat 31 terminating in a tire bead seat flange 32 extending radially therefrom which is axially outwardly curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface extending from the outer periphery of the hub cap 43 to the drop center wheel rim 23, which also has its exposed surfaces painted. The particular tire 25 illustrated in the drawings is a modern tubeless tire having a scuff bead 250 extending from its side wall 251. The said tubeless tire 25, when used on the vehicle wheel 21, requires a valve stem (not shown) mounted in sealed relationship through a suitable valve stem aperture (not shown) provided in the outer wall 29 of the drop center rim channel 28 of the rim 23 of the said wheel 21. The wheel and tire trim 20 of the invention is such that access to the said valve stem is always available for inflation or deflation of the tire.

The said vehicle wheel and tire trim assembly 20 disclosed in FIGS. 1, 2, 2-A and 3 consists of a rim trim element 24, a tire trim element 26, a color stripe element 27 of a color contrasting with the color of the tire trim element 26, and an anchorage element 30, all of which are annular and particularly formed for assembly into a wheel and tire trim assembly 20 that is readily securely mounted on a vehicle wheel 21 as best shown in FIGS. 1 and 2. With such construction many desirable color effects may be obtained; for example, one of which may consist of a stainless steel or other metallic colored trim element 24, a white tire trim element 26, and a black, red or other color stripe element 27 which suitably contrasts or blends with the color of the motor vehicle and/or its wheels.

The rim trim element 24 of the wheel trim assembly 20 preferably consists of an annular axially disposed stainless steel sleeve portion 240 having an outer generally radially disposed annular bead or bull nose portion 241 at the axial outer edge thereof. The said rim trim element may be of any suitable material and formed with reflective nubs or depressions or other patterns therein if so desired. The rim trim element 24 is of a diameter somewhat smaller than that of the radial inner annulus of the tire bead seat flange 32 of the vehicle wheel 21 to accommodate the anchorage element 30, the tire trim element 26 and the color stripe element 27 in the proper compressed relationship therebetween as hereinafter described in detail.

The annular tire trim element 26 is preferably molded of rubber or a synthetic rubber having ability to return to its normal molded shape from any position to which it may be flexed, and consists in cross section of an arcuate side wall portion 260 terminating at its radial inner periphery into an annular bead 261 from the inner axial edge of which extends an anchorage flange 262. The said bead 261 has an annular continuous bulbous outer edge 2610 and an annular continuous arcuate inner seat 2611 which generally conforms to and seats against the tire bead seat flange 32 at the juncture 320 of the annular tire bead seat 31 and the annular tire bead seat flange 32 of the vehicle wheel 21 when the wheel and tire trim assembly 20 is mounted thereon. In the event the tire trim element 26 is molded of rubber, which discolors upon frictional contact with the side wall 251 of the tire 25, it is desirable to keep the outer periphery 2600 of the side wall portion 260 of the tire trim element 26 spaced from the side wall 251 of the tubeless tire 25 for the purpose of preventing the discoloration of the relatively thin outer peripheral portion of the said tire trim element 26. This may be accomplished by the employment of a suitable axially inwardly disposed annular gage flange 2601 preferably molded integral with the side wall portion 260 of the tire trim element 26. As best shown in FIG. 2, the annular gage flange 2601 holds the tire trim element spaced from the side wall 251 of the tubeless tire 25.

The annular color stripe element 27 is preferably injection molded of a butyl or other synthetic rubber, although it may be molded of a natural rubber or a rubber compound. The said color stripe element 27 consists of an arcuate side wall portion 270 which terminates at its radial inner periphery into an annular arcuate bead 271 from the radially inner edge of which is an axially extending anchorage flange 272 which is coextensive of the anchorage flange 262 of the annular tire trim element 26 when the said annular tire trim element 26 and the annular color stripe element 27 are mated together as shown in FIG. 2. By reference to FIG. 2, it will be noted that the arcuate bead 271 of the color stripe element 27 is formed to mate with both the annular bead 261 of the tire trim element 26 and the axial inner face of the radially disposed annular bead or bull nose portion 241 of the rim trim element 24 when the several elements of the wheel and tire trim assembly 20 are assembled together prior to mounting on a vehicle wheel. The said annular color stripe element 27 preferably has an annular groove 273 in the axial outer portion thereof located substantially at the juncture of its arcuate side wall portion 270 and its arcuate bead portion 271, which annular groove 273 receives the free annular edge 2410 of the bead or bull nose portion 241 of the rim trim element 24 when the several elements of the wheel and tire trim assembly 20 are assembled together prior to mounting on a vehicle wheel.

The annular axially disposed anchorage element 30 is preferably formed of a natural rubber or rubber compound extrusion, cut to the proper length, and vulcanized or otherwise secured together at its cut ends. Alternately the said anchorage element 30 may be molded or extruded of a synthetic rubber; however, a live natural rubber or rubber compound is generally more satisfactory than a synthetic rubber. An extrusion which is vulcanized or cemented together to form an annulus of the proper size is preferable to molding from a cost standpoint. In cross section the annular anchorage element 30 consists of a base 301 which nearly fits over the outer diameter of the sleeve portion 240 of the rim trim element 24, which base 301 is provided with a plurality of circumferential generally triangular axially spaced radially extending flexible annular teeth 302 formed in cross section to flex readily in an axially outwardly direction when the wheel and tire trim assembly 30 is mounted on a vehicle wheel 21. The axial outer periphery of the anchorage element 30 is provided with an annular axially outwardly extending, but relatively narrow compression anchor flange 303 which overlies the axially inwardly disposed anchorage flanges 262 and 272 of the annular tire trim element 26 and the annular color stripe element 27 which are stacked therebelow when the annular color stripe element 27, the annular tire trim element 26, and the annular anchorage element 30 are assembled in that order on the rim trim element 24, thereby forming the wheel and striped tire trim assembly 20 which is mounted as a unit on a vehicle wheel 21. It is essential that the compression flange 303 be narrow to avoid the creation of too much frictional holding of the wheel and tire trim assembly 20 in place on a vehicle wheel; otherwise the removal of the wheel and tire trim assembly 20 would be so difficult as to cause damage thereto, particularly the rim trim element 24 thereof, during the removal of the said wheel and tire trim assembly 20 from the vehicle wheel. It is preferable that the axial outer portion of the anchorage flange 303 of the annular anchorage element 30 be provided with a radially extending peripheral flange 3003 curved to seat against the juncture 320 of the annular tire bead seat 31 and the tire bead seat flange 32 of the vehicle wheel 21 when the wheel and tire trim assembly 20 is mounted thereon.

Reference is now made particularly to FIG. 2–A which shows the rim trim element 24, the tire trim element 26, the color stripe element 27, and the anchorage element 30 unassembled and exploded from each other and from the rim 23 and tire 25 of a vehicle wheel 21. The combined thickness "A" of the anchor flange 303 of the anchorage element 30, thickness "B" of the anchorage flange 262 of the tire trim element 26, and thickness "C" of the anchorage flange 272 of the color stripe element 27 is such that it is somewhat greater than the radial distance "R" indicated in FIG. 2 between the annulus 310 of the tire bead seat 31 of the rim 23 of the vehicle wheel 21 and the radial outer periphery of the rim trim element 24.

The assembly of a vehicle wheel and tire trim 20 is accomplished by first telescoping the color stripe element 27 onto the sleeve portion 240 of the rim trim element 24 with the annular bead portion 270 of the color stripe element 27 nested into the annular bead or bull nose portion 241 of the rim trim element 24. The tire trim element 26 is then telescoped onto the sleeve portion 240 of the rim trim element 24 with the bulbous outer edge 2610 of the bead portion 261 of the tire trim element 26 nested into the annular bead portion 270 of the color stripe element 27. The anchorage element 30 is then telescoped onto the sleeve portion 240 of the rim trim element with the compression anchor flange 303 thereof overlying the anchorage flange 262 of the tire trim element 26 which in turn overlies the anchorage flange 272 of the color stripe element 27. Alternately, the color stripe element 27 and the tire trim element 26 may be nested axially together forming a sub-assembly which may be telescoped simultaneously on the sleeve portion of the rim trim element 24, after which the anchorage element 30 may be telescoped on the said sleeve portion of the rim trim element 24 with the compression anchorage flange 303 thereof overlying the anchorage flanges 262 and 272 of the tire trim and the color stripe elements 26 and 27, thus also making-up a vehicle wheel and tire trim assembly 20 ready for mounting on a vehicle wheel 21.

The vehicle wheel and tire trim assembly 20 is mounted as a unit on a vehicle wheel 21 by forcibly telescoping it into the tire bead seat annulus 310 of the said vehicle wheel until it assumes the position shown in FIG. 2. This bends the annular anchorage teeth 302 radially outwardly and also compresses the annular anchorage flanges 303 of the anchor element 30, 262 of the tire trim element 26, and 272 of the color stripe element 27 between the annulus 310 of the tire bead seat 31 of the vehicle wheel 21 and the rim trim element 24, and thereby firmly anchors the vehicle wheel and tire trim assembly and all of its components in its and their proper position on the vehicle wheel 21.

To remove the wheel and tire trim assembly 20 from a vehicle wheel 21 after having mounted the same thereon, it is necessary to pry the said assembly 20 therefrom by engaging the axially inward portion thereof and prying at intervals therearound, preferably with a suitably hooked removal tool (not shown). During removal of the wheel and tire trim assembly 20 from the vehicle wheel 21, the annular teeth 302 of the anchorage element 30 reverse their position shown in FIG. 2, and the said wheel and tire trim assembly 20 may be readily removed by continued but less forceful prying necessary to overcome the friction between the compression anchor flange 303 of the anchorage element 30 and the tire bead seat annulus of the vehicle wheel 21.

A second embodiment of the wheel and tire trim assembly 50 disclosed in FIGS. 4, 5, 6 and 5–A is the same as the first embodiment of the wheel and tire trim assembly 20 disclosed in FIGS. 1, 2, 3 and 2–A except that the annular color stripe element 27 has been omitted. As a result, the anchorage flange 2620 of the tire trim element 26 of the said second embodiment of the invention and the compression anchorage flange 3030 of the anchorage element 30 of the said second embodiment of the invention are made thicker as illustrated in FIG. 5–A so that the combined thickness "A" of the anchor flange 3030 of the anchorage element 30 and the thickness "D" of the anchorage flange 2620 of the tire trim element 26 is such that it is somewhat greater than the radial distance "R" in FIG. 5 between the annulus 310 of the tire bead seat 31 of the rim 23 of the vehicle wheel 21 and the radial outer periphery of the axially disposed sleeve portion 240 of the rim trim element 24.

Thus, in the second embodiment of the invention disclosed in FIGS. 4, 5, 6 and 5–A, as in the first embodiment of the invention disclosed in FIGS. 1, 2, 3 and 2–A, provisions are made for anchorage of the wheel and tire trim assembly 50 when telescopingly mounted on the vehicle wheel rim 23 in the tire bead seat annulus 310 thereof to employ both resilient toothed means and compressive means for firmly yet removably anchoring the said assembly on the said vehicle wheel while positively maintaining the several elements of the wheel and tire trim assembly in their proper unitary relationship on the vehicle wheel.

Although but two embodiments of the invention have been disclosed and described herein, it is obvious that many changes and alterations may be made in the size, shape, arrangement and detail of the various elements of the invention, all without departing from the spirit and scope of the invention as set forth in the appended claims.

I claim:

1. A wheel and tire trim assembly for vehicle wheels including a rim having a tire bead seat forming an axially outwardly disposed tire bead seat annulus, a tire bead seat flange, and a tire mounted on said rim, said wheel and tire trim assembly covering said tire bead seat and the exposed portion of said rim outwardly therefrom and trimming said tire mounted on said rim comprising an annular wheel trim element including an axially disposed annular sleeve portion somewhat smaller in diameter than the said tire bead seat annulus of the said vehicle wheel, and an axially outer radially disposed bull nose portion, an annular color stripe element including an arcuate side wall portion, an annular bead portion, and an axially disposed anchorage flange portion extending axially inwardly from said bead portion, an annular tire trim element including an arcuate radially disposed side wall portion, an annular bead portion, and an axially disposed anchorage flange portion extending axially inwardly from said bead portion, and an annular anchorage element including an annular axially disposed base portion, a plurality of circumferential generally triangular axially spaced radially extending flexible anchorage teeth on said base portion, and an annular axially disposed anchorage flange portion extending axially outwardly from said base portion, said color stripe element, said tire trim element and said anchorage element being assembled in axial juxtaposition on said wheel trim element in that order with said color stripe element adjacent said bull nose portion of said tire trim element and with said anchorage flange portions of said color stripe, tire trim and anchorage elements disposed in overlapping relationship, the outside diameter of said anchorage teeth and the outside diameter of the overlapping anchorage flange portions of the color stripe, tire trim and anchorage elements when assembled on said annular wheel trim element being somewhat greater than the diameter of the tire bead seat annulus of said vehicle wheel whereupon the telescoping of the axially disposed portion of said wheel and tire trim assembly within the tire bead seat annulus of said vehicle wheel firmly but removably anchors the said vehicle wheel and tire trim assembly as a unitary whole on said vehicle wheel employing a combined toothed and compressive gripping action.

2. A wheel and tire trim assembly according to claim 1 wherein the axially extending anchorage flange portion of annular anchorage element is provided with a radially extending peripheral flange which, together with an annular arcuate seat formed on the annular bead portion of said tire trim elements, abut the juncture between the annular tire bead seat and tire bead seat flange of the rim of the vehicle wheel.

3. A wheel and tire trim assembly according to claim 1 wherein the side wall portion of the annular tire trim element is provided with means holding the radial outer periphery thereof in spaced relationship from the side wall of said tire.

4. A wheel and tire trim assembly for vehicle wheels including a rim having a tire bead seat forming an axially outwardly disposed tire bead seat annulus, a tire bead seat flange, and a tire mounted on said rim, said wheel and tire trim assembly covering the exposed portion of said rim and trimming a tire mounted on said rim comprising an annular wheel trim element including an axially disposed annular sleeve portion somewhat smaller in diameter than the said tire bead seat annulus of said vehicle wheel and an axially outer radially disposed bull nose portion, an annular tire trim element including an arcuate radially disposed side wall portion, an annular bead portion, and an axially disposed anchorage flange portion extending axially inwardly from said bead portion, an annular anchorage element including an annular axially disposed base portion, a plurality of circumferential generally triangular axially spaced radially extending flexible anchorage teeth on said base portion, and an annular axially disposed anchorage flange portion extending axially outwardly from said base portion and offset radially outwardly therefrom, said tire trim element and said anchorage element being assembled in axial juxtaposition on said wheel trim element in that order with said tire trim element adjacent said bull nose portion of said wheel trim element and with said anchorage flange portions of said anchorage element and said wheel trim element disposed in radial overlapping relationship, the outside diameter of said anchorage teeth and the outside diameter of the overlapping anchorage flange portions of the tire trim and anchorage elements when assembled on said annular wheel trim element being somewhat greater than the diameter of the tire bead seat annulus of said vehicle wheel whereupon the telescoping of the axially disposed portion of said wheel and tire trim assembly within the tire bead seat annulus of said vehicle wheel firmly but removably anchors the said vehicle wheel and tire trim assembly as a unitary whole on said vehicle wheel employing a combined toothed and compressive gripping action.

5. A wheel and tire trim assembly as in claim 4 wherein the axially extending anchorage flange portion of annular anchorage element is provided with a radially extending peripheral flange, which, together with an annular arcuate seat formed on the annular bead portion of said tire trim element, abut the juncture between the annular tire bead seat and tire bead seat flange of the rim of the vehicle wheel.

6. A wheel and tire trim assembly as in claim 4 wherein the side wall portion of the annular tire trim element is provided with means holding the radial outer periphery thereof in spaced relationship from the side wall of said tire.

References Cited by the Examiner

UNITED STATES PATENTS

| | | | |
|---|---|---|---|
| 2,963,325 | 12/60 | Aske et al. | 301—37 |
| 2,970,010 | 1/61 | Lyon | 301—37 |
| 2,996,334 | 8/61 | Aske | 301—37 |
| 3,034,834 | 5/62 | Aske et al. | 301—37 |

ARTHUR L. LA POINT, *Primary Examiner.*